United States Patent Office 2,937,205
Patented May 17, 1960

2,937,205
GAMMA-HYDROXY-ALPHA,BETA-ACETYLENIC KETONES

Dale N. Robertson, Midland, Mich., assignor to The Dow Chemical Company, Midland, Mich., a corporation of Delaware No Drawing. Application February 3, 1958
Serial No. 712,653

4 Claims. (Cl. 260—590)

The present invention relates to gamma-hydroxy-alpha, beta-acetylenic ketones. The new compounds conveniently may be characterized by the general formula

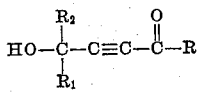

wherein R represents lower alkyl, $R_1$ and $R_2$ represent independently selected members of the group alkyl, phenyl and cycloalkyl, and wherein $R_1$ and $R_2$ may form with the carbon atom of attachment a cycloalkyl ring. The expression "lower alkyl" as employed herein refers to aliphatic hydrocarbon radicals having from 1 to 4 carbon atoms, inclusive, and the term "cycloalkyl" as employed herein refers to those cycloaliphatic hydrocarbon radicals containing from 5 to 6 carbon atoms, inclusive. The compounds of the present invention have been tested and found to be effective as active toxic ingredients of compositions for the control of many bothersome pests.

The new and useful compounds conveniently may be prepared by hydrolysis or alcoholysis of tetrahydropyran adducts of tertiary acetylenic hydroxy ketones. The latter may be prepared as described in my copending application entitled "Gamma-Tetrahydropyranyloxy-Alpha, Beta-Acetylenic Ketones," Serial Number 712,655, filed concurrently herewith. The reaction proceeds smoothly in the presence of an acid catalyst such as p-toluenesulfonic acid or hydrochloric acid and at temperatures of from room temperature to about 100° C. Temperatures somewhat below room temperature may be employed although there appears to be no advantage derived therefrom.

The cleaving agent may be water or any one of the many aliphatic alcohols and polyols such as methanol, ethanol, propanol, glycol, glycerol or the like. The cleaving agent should be employed in at least 1 molar equivalent and preferably in a 10 to 20 molar excess. Higher ratios of the cleavage agent may be employed but are not materially advantageous.

The following examples are illustrative of the present invention but are not to be construed as limiting.

*Example 1.—5-hydroxy-5-methyl-3-undecyn-2-one*

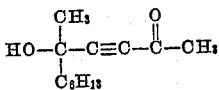

5-methyl-5 - (tetrahydro-2-pyranyloxy) - 3-undecyn-2-one (23 grams; 0.082 mole) was dispersed in 75 ml. of methanol (23 mole excess) and a pinch (approximately 0.05–0.1 gram) of para-toluenesulfonic acid added with stirring. Upon completion of the reaction, the reaction mixture was diluted with an equal volume of ice-water and extracted twice with two 75 ml. portions of ether. The combined ether fractions were washed with dilute aqueous sodium bicarbonate; twice with a saturated aqueous solution of sodium chloride; and, subsequently dried over magnesium sulfate in a refrigerator overnight. The ether was removed by fractional distillation and the residual oil fractionally distilled under reduced pressure to obtain a 5-hydroxy-5-methyl-3-undecyn-2-one product boiling at 115°–119° C. at 0.02 mm. pressure.

*Example 2.—4-(1-hydroxycyclohexyl)-3-butyn-2-one*

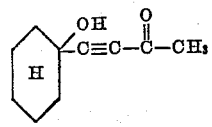

In the manner of Example 1, employing 4-(1-(tetrahydro-2-pyranyloxy)cyclohexyl)-3-butyne-2-one in place of 5 - methyl-5-(tetrahydro-2-pyranyloxy)-3-undecyn-2-one, there was obtained 4-(1-hydroxycyclohexyl)-3-butyne-2-one boiling at 90°–92° C. at 0.05 mm.

*Example 3*

In the manner of the foregoing examples, employing the following starting compounds, the appropriate gamma-hydroxy-$\alpha,\beta$-acetylenic ketones were prepared.

5-hydroxy-5-methyl-3-heptyn-2-one (B.P. 78°–82° C./0.015 mm.) by reacting 5-methyl-5-(tetrahydro-2-pyranyloxy)-3-heptyn-2-one, methanol and a catalytic amount of para-toluenesulfonic acid.

5-hydroxy-5-methyl-3-hexyn-2-one (B.P. 68°–70° C./0.02 mm.) by reacting 5-methyl-5-(tetrahydro-2-pyranyloxy)-3-hexyn-2-one, ethanol and a catalytic amount of para-toluenesulfonic acid.

5-hydroxy-5,7-dimethyl-3-octyn-2-one (B.P. 86°–92° C./0.02–0.03 mm.) by reacting 5,7-dimethyl-5-tetrahydro-2-pyranyloxy)-3-octyn-2-one, water and a catalytic amount of hydrochloric acid.

In a like manner, other gamma-hydroxy-$\alpha,\beta$-acetylenic ketones may be prepared. Thus, for example, the hydrolysis or alcoholysis of 5-phenyl-5-(tetrahydro-2-pyranyloxy)-3-hexyn-2-one; 7-cyclohexyl-7-(tetrahydro-2-pyranyloxy)-5-nonyn-4-one; and 5-ethyl-5-(tetrahydro-2-pyranyloxy)-3-nonyn-2-one will result in the production of 5-hydroxy-5-phenyl-3-hexyn-2-one; 7-hydroxy-7-cyclohexyl-5-nonyn-4-one; and 5 - hydroxy-5 - ethyl-3-nonyn-2-one, respectively.

The compounds of the present invention have been tested and found to be effective as the toxic ingredient of compositions used for the control of bacterial or fungal organisms. In a representative operation, 0.25 percent by weight of each of the following compounds, 5-hydroxy-5-methyl-3-undecyn-2-one, 5 - hydroxy-5-methyl-3-heptyn-2-one, 5-hydroxy-5-methyl-3-hexyn-2-one and 5-hydroxy-5,7-dimethyl-3-octyn-2-one, gave 100 percent control of *Staphylococcus aureus*, *Aspergillus terreus*, *Penicillium digitatum* and *Rhizopus nigricans*.

I claim:
1. Gamma-hydroxy-$\alpha,\beta$-acetylenic ketones having the formula

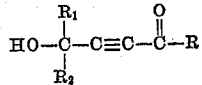

wherein $R_1$ and $R_2$ each represent an independently selected radical of the group consisting of alkyl, phenyl, cyclohexyl, cyclopentyl, provided that the compound contains no more than 1 ring and R is a lower alkyl group.

2. A gamma-hydroxy-$\alpha,\beta$-acetylenic ketone as claimed in claim 1 wherein each $R_1$ and $R_2$ are alkyl.

3. A gamma-hydroxy-$\alpha,\beta$-acetylenic ketone as claimed in claim 1 wherein R and $R_1$ are each methyl, and $R_2$ is phenyl.

4. A gamma-hydroxy-α,β-acetylenic ketone as claimed in claim 1 wherein R and $R_1$ are each methyl and the $R_2$ is hexyl.

References Cited in the file of this patent

Newman et al.: J. Org. Chem., vol. 17, p. 967 (1952).
Wagner et al.: Synthetic Organic Chemistry, pp. 171–2 (1953).